Fig. 3

March 14, 1939.  E. L. WIEGAND ET AL  2,150,532
CALCINING FURNACE AND HEATING MEANS THEREFOR
Original Filed June 11, 1937  9 Sheets-Sheet 4

Fig. 4

INVENTOR.
Edwin L. Wiegand
Oscar R. Olson
BY Hull, Brock & West
ATTORNEY.

March 14, 1939. E. L. WIEGAND ET AL 2,150,532
CALCINING FURNACE AND HEATING MEANS THEREFOR
Original Filed June 11, 1937 9 Sheets-Sheet 7

INVENTOR.
Edwin L. Wiegand
BY Oscar R. Olson
Hull, Broch & West
ATTORNEY.

Patented Mar. 14, 1939

2,150,532

UNITED STATES PATENT OFFICE 2,150,532

CALCINING FURNACE AND HEATING MEANS THEREFOR

Edwin L. Wiegand and Oscar R. Olson, Pittsburgh, Pa.; said Olson assignor to said Wiegand Application June 11, 1937, Serial No. 147,678
Renewed January 16, 1939

27 Claims. (Cl. 263—34)

This invention relates generally to high temperature furnaces and more particularly to furnaces which are generally known as muffle type furnaces in which the material being treated is maintained out of direct contact with the products of combustion. This application is related to our copending applications Ser. No. 147,679 filed June 11, 1937 and Ser. No. 203,495 filed Apr. 22, 1938. The specific furnace herein disclosed is a rotary furnace of the muffle type adapted to have the material to be treated fed therethrough continuously. The furnace consists generally of a central chamber or retort through which the material to be treated is fed and which is surrounded by a combustion chamber which is constructed of suitable refractory material such as sillimanite, aluminum silicate or zirconium refractory material. The retort is preferably formed of plumbago. The inner wall of the combustion chamber is lined with refractory material which in turn is covered with a heat insulating brick and the whole structure is enclosed within a metal shell or casing which is rotatably supported on rollers carried by a base member. Suitable means are provided for raising and lowering one end of the base member and with it the furnace which is carried thereby. Suitable driving means are provided which are adjustable for rotating the furnace at various speeds.

In normal operation the furnace is inclined downwardly toward the delivery end thereof at an angle of about 5° to 10° and by varying the angle of inclination of the furnace or by varying the speed of rotation of the furnace or both, the rate at which the material is fed through the retort is varied which thus varies the time of the heating cycle of the material being treated. Suitable feeding and discharge mechanism are provided for delivering material to the furnace and for discharging it therefrom which form no part of this invention. The feed mechanism, however, should in most cases be adjustable to vary the rate of delivery of material to the furnace. The combustion chamber is very small with respect to the quantity of heat which is generated therein and the amount of material capable of being treated in the furnace per hour.

With the particular furnace herein disclosed, there is obtainable, when desired, a temperature in the combustion chamber (without preheating the fuel) of approximately 3000° F. and a temperature in the retort of between 2100° F. and 2500° F. depending upon the thickness and conductivity of the wall of the retort and upon the rate of flow of material through the retort. Assuming a constant fuel supply, the temperature in the combustion chamber and retort varies with the rate of heat abstraction which varies with the rate of delivery of material through the retort. The combustion chamber is heated by a series of specially designed burners preferably disposed about the wall thereof so as to discharge tangentially with respect to the combustion chamber which is preferably cylindrical in shape. The preferred fuel for the burners is 1000 B. t. u. per cubic foot natural gas which is supplied to the burners from a common manifold under a pressure of from 80 to 100 pounds per square inch. It is of course understood that this pressure can be varied depending upon the exigencies of the occasions and different conditions of operation and the material to be treated. In view of the fact that the fuel is delivered to the burners at high pressure, we employ special mechanism for mixing the fuel and supplying it to the burners which are also specially designed. Such a furnace as herein disclosed is capable of utilizing efficiently 250 cubic feet of 1000 B. t. u. per cubic foot natural gas per hour per cubic foot of combustion chamber. It has not been feasible or practical heretofore to supply natural gas to a Bunsen type burner at a pressure above 20 to 30 pounds per square inch or to supply artificial gas at a pressure above 15 pounds per square inch. This is due to the fact that gas when supplied to a Bunsen type burner under a pressure in excess of 20 to 30 pounds per square inch will not inspirate the proper proportion of air to properly support combustion, as the inspiratory efficacy does not increase in direct proportion to the increase in pressure or velocity, which is a function of the pressure. In a furnace of this character it has been found that the ultimate fuel mixture should preferably contain about ten parts air and one part gas. When natural gas is delivered to a burner at a pressure of say 20 pounds per square inch, the velocity of the fuel is such that it will inspirate air at the burner in about that proportion, but when the fuel is fed to the burner inspirator at a pressure of, say 80 to 100 pounds per square inch, the velocity of the fuel discharged from the manifold into the burner inspirator is such that it will only inspirate in the proportion of approximately one to one. Therefore, in order to obtain the proper mixture of gas and air, it is necessary to first mix about five parts of air with one part of gas before delivering the mixture to the burner inspirator. This mixture is then fed to the burners through their respective inspirators preferably at a pressure of 90 to 95 pounds per square inch where it mixes with an approximately equal volume of air which will give the proper mixture of gas and air, that is, one part gas and about eleven parts air. The pre-mixing of gas and air is accomplished by placing an inspirator in the fuel supply line in advance of the burner manifolds and supplying air thereto at a pressure of about 100 pounds per square inch and supplying gas thereto at a pressure of from 75 to 80 pounds per square inch. This results in a mixture of gas and air in the proportion of approximately one part gas to five parts air, which is delivered to the manifolds at a pressure of 90 to 95 pounds per square inch.

The furnace also includes burner tunnels arranged about the wall of the furnace and into which the burners discharge. In constructing such burner tunnels, it is necessary to take into consideration the rate of flame propagation of the fuel mixture, premature kindling, type of refractory used in the construction of the combustion chamber, the position of the flame with respect to the burner tunnels, the size, shape and capacity of the burner tunnels which must be such as to create a zone in which the velocity of the fuel mixture is equal to the rate of flame propagation of the fuel. The fuel mixture must be delivered to the burner tunnel at such pressure and velocity that the fuel mixture will be kept burning in a well defined zone in the burner tunnel to keep it from flashing or burning back too close to the burner proper. The velocity of the fuel mixture must be such as to maintain within the burner tunnels a well defined zone in which the flame will be definitely placed and maintained. The rate of flame propagation or the speed of uniform movement of flame varies for different mixtures of fuel and different grades of fuel. With the natural gas analyzed into its constituent parts, the flame speed curves of these constituents may be ascertained by well known formulas (see Technical Paper 427, Department of Commerce, entitled "Propagation of Flame and Mixtures of Natural Gas and Air" by H. F. Coward and H. P. Greenwald, in which appears the following statement:

"The speed of uniform movement of flame—that is the initial stage in the propagation of flame from the open end of a tube toward the closed end—is calculable for various samples of natural gas from the known speeds of the individual hydrocarbons."

The specially designed burner tunnels are made of a highly refractory material such as zirconium oxide or thorium oxide or refined zirconium silicate—alone or in various combinations of these materials. Suitable bonding material may be used when and if desired. The burner tunnels are either formed directly in the wall of the combustion chamber or in blocks which are set into the wall of the combustion chamber and so arranged that the burners discharge tangentially with respect to the wall of the combustion chamber so as to wrap the flame around the retort which preferably is cylindrical and arranged concentrically within the cylindrical combustion chamber. The wall of the combustion chamber is preferably made of sillimanite or aluminum silicate or a refined zircon or zirconia refractory material. It is preferable to use a refractory material having a steep temperature gradient for the steeper the temperature gradient of the furnace wall the lower the fuel velocity required down to the minimum (optimum) which is the rate of flame propagation in the absence of premature kindling.

The retort is preferably made of plumbago and is preferably covered both on the inside and the outside with a thin coating of highly stable refractory material about $\frac{1}{32}''$ to protect it against erosion, corrosion and abrasion. This coating may be either zirconium oxide or thorium oxide or zirconium silicate. The retort may also be formed of carborundum or silicon carbide although plumbago is preferable. The volume of the combustion chamber and consequently the surface area thereof is very small compared to the amount of fuel burned and the distance between the inner wall of the combustion chamber and the outer wall of the retort is comparatively small. Due to the fact that the heat loss through the wall of the combustion chamber is directly proportional to the surface area thereof and as the inner wall of the combustion chamber is a reflecting surface which reflects heat against the retort, it will be seen that the reduction of the distance between such wall and the outer wall of the retort greatly increases the efficiency of the furnace and provides greater energy concentration. Due to the design and construction of the furnace, it is possible to burn fuel under such high pressure that the capacity and temperature of the furnace is very high and its size greatly reduced so that it is possible to treat at least four times as much material per hour as can be treated by any furnace of the same size burning gas under a low pressure such as 20 to 30 pounds per square inch. Furnaces have been produced which burn gaseous fuel supplied under a pressure of 20 to 30 pounds per square inch and attain a maximum temperature of 2500° to 2600° F. in the combustion chamber; but heretofore it has been impossible to maintain such a temperature within a muffle and treat the same amount of material per hour therein.

The burners are preferably arranged about the wall of the combustion chamber in staggered relation and positioned so as to discharge tangentially with respect to the wall of the combustion chamber and retort. The fuel is fed to the burner manifolds at a pressure of 90 to 95 pounds per square inch. In order to prevent too high a back pressure within the combustion chamber which may occur due to the relatively small size of the combustion chamber or as a result of the large quantity of fuel burned therein, means are provided for expirating or exhausting the burned gases from the combustion chamber and for maintaining the desired pressure therein. This means consists essentially of an exhaust mechanism which includes a manifold which surrounds the furnace and communicates therewith at a plurality of points so that the burned gases are withdrawn from the furnace at the desired rate so as to maintain the desired pressure condition within the combustion chamber. This exhaust mechanism is so arranged as to withdraw the burned gases through a plurality of exhaust ports disposed intermediate the ends of the combustion chamber so as to draw equally from various parts of the combustion chamber. As the material in the retort is maintained out of contact with the products of combustion in the combustion chamber, it is feasible and practical to maintain a controlled atmosphere in the retort when and if desired.

If the fuel is preheated before delivery to the burner manifolds, higher temperatures and efficiency can be obtained with the same fuel pressure and velocity.

One of the objects of the invention is to provide a high temperature heating furnace of the character described having therein a refractory retort through which material to be treated is delivered and means for regulating the rate of delivery of material through the retort.

Another object of the invention is to provide a rotary furnace of the muffle type having a plurality of burners arranged thereon in such a manner as to discharge tangentially with respect to the furnace.

Another object of the invention is to provide a heating system for furnaces of the character described which includes a combustion chamber, a plurality of gaseous fuel burners for heating such a chamber, a rotatable refractory retort disposed within the combustion chamber and through which material to be treated is delivered, means for delivering gaseous fuel to the burners and means for withdrawing burned gases from the combustion chamber at a predetermined rate so as to maintain a predetermined pressure condition within the combustion chamber.

A further object of the invention is to provide a gaseous fuel burner for furnaces of the character described which includes a burner tunnel formed of refractory material and having formed therein a combustion chamber of such size, shape and surface area as to create a zone in which the velocity of the fuel mixture is equal to or greater than the rate of flame propagation of the fuel so as to maintain the flame in a well defined area with respect to the burner tunnel.

A further object of the invention is to provide a method of producing high temperatures within a furnace which consists in delivering to the furnace a mixture of gaseous fuel and air at a manifold pressure in excess of 30 pounds per square inch and mixing with such fuel mixture an approximately equal volume of air and burning the mixture in the furnace and withdrawing the burned gases from the furnace at a predetermined rate so as to maintain the desired pressure condition within the furnace.

A still further object of the invention is to provide a furnace of the character described which includes a rotatable combustion chamber in which is arranged a refractory retort, the combustion chamber being heated by means of a plurality of gaseous fuel burners disposed about the periphery thereof, the furnace of the combustion chamber and retort being preferably cylindrical in shape and concentrically arranged, there being a relatively small space between the wall of the combustion chamber and the wall of the retort whereby to provide a large energy concentration within a relatively small space.

A still further object of the invention is to provide a furnace of the character described which includes a rotatable combustion chamber in which is arranged a refractory retort through which the material to be treated may be passed without direct contact with the products of combustion and in which the rate of delivery of material through the retort may be regulated.

Another object of the invention is to provide a rotary furnace of the character described which includes a combustion chamber in which is arranged a refractory retort through which the materal being treated is fed and in which a controlled atmosphere may be maintained, when and if desired.

Another object of the invention is to provide a heating system for treating material which includes a muffle type furnace in which the retort is rotatable and is formed of suitable refractory material which will stand a temperature 3000° F. or more and through which the material being treated may be fed in a continuous stream.

A still further object of the invention is to provide a rotary furnace of the character described and heating means therefor which will accomplish the objects of the invention as hereinbefore stated and which is well adapted for treating material in a continuous or a non-continuous process and which is adapted to be produced and assembled at a minimum cost.

Further and more limited objects of the invention will appear as the description proceeds and by reference to the accompanying drawings in which.

Referring now to the drawings, the reference character 1 designates generally the furnace which consists essentially of an outer metal shell or casing 2 which is preferably cylindrical in shape and which is lined with a layer of heat insulating material 2ª of considerable thickness such as insulating brick. The combustion chamber proper is preferably cylindrical in shape and fits within the layer of heat insulating brick and is formed of suitable refractory material having a steep temperature gradient such as sillimanite or aluminum silicate or zirconium refractory material. The wall of the combustion chamber is indicated by the reference character 3. Disposed within the combustion chamber, preferably in concentric relation therewith, is a cylindrical retort 4 which is preferably formed of plumbago and which preferably is covered on both the inside and on the outside with a coating of highly refractory material such as zirconium oxide or thorium oxide or zirconium silicate about $\frac{1}{32}"$ in thickness which serves as a protection against erosion, corrosion and abrasion. The ends of the combustion chamber are closed by a pair of cylindrical plates 5 and 6 which are formed of the same material as the walls of the combustion chamber and which have circular openings therein which receive the opposite ends of the retort 4. A pair of plates 7 and 8 which are formed of heat insulating material fit over the opposite ends of the furnace and also have openings therein into which the ends of the retort project. Fitting over the receiving end of the retort is a circular plate 9 which has an opening therein and which is formed of refractory material. Fitting over the delivery end of the retort is a block 10 of heating refractory material which has openings 11 therein through which the material may be discharged. Fitting over the opposite ends of the furnace are end plates 12 and 13 which are formed of metal and which are secured to the outer metal shell 2 by means of suitable bolts. These end plates are made up of a plurality of sections and are so positioned as to leave a slight air space between them and the end plates 7 and 8, respectively.

Disposed adjacent the end block 10 is a discharge funnel 14 into which the material from the retort is discharged and which delivers onto a conveyor 15. The funnel engages under the end plate 12 and is held in place by bolts 16 and 17 and a spider 19. Disposed between the end plate 10 and the spider 19 is a member 20 which serves to hold the end block 10 in place.

In order to provide proper support for the retort, there are provided four blocks of refractory material which are indicated by the reference characters 21, 22, 23 and 24 which are rectangular in section and which are arranged in radial slots provided in the wall of the furnace. The slots extend entirely through the wall of the furnace and are closed by metal plates 25, 26, 27 and 28. The inner ends of these supporting blocks are shaped to fit the curvature of the retort and bear thereagainst and support the retort at its central portion. The furnace is also provided with four radially disposed bores or openings 29, 30, 31 and 32 which extend through the outer wall thereof, that is, through the refractory material and also through the heat insulating material. Arranged in the outer ends of these bores are four tubular members 33, 34, 35 and 36 which are formed of refractory material and which are tubular in shape. These members are set in recesses provided in the heat insulating material and constitute continuations of the bores 29, 30, 31 and 32. Extending about the wall of the furnace at this point is an annular member 37 formed of metal and made up of a plurality of sections which are secured together in any suitable manner. The annular member 37 has circular openings therein which receive the outer ends of the tubular members 33, 34, 35 and 36, as shown most clearly in Figs. 2 and 5.

Figure 1:
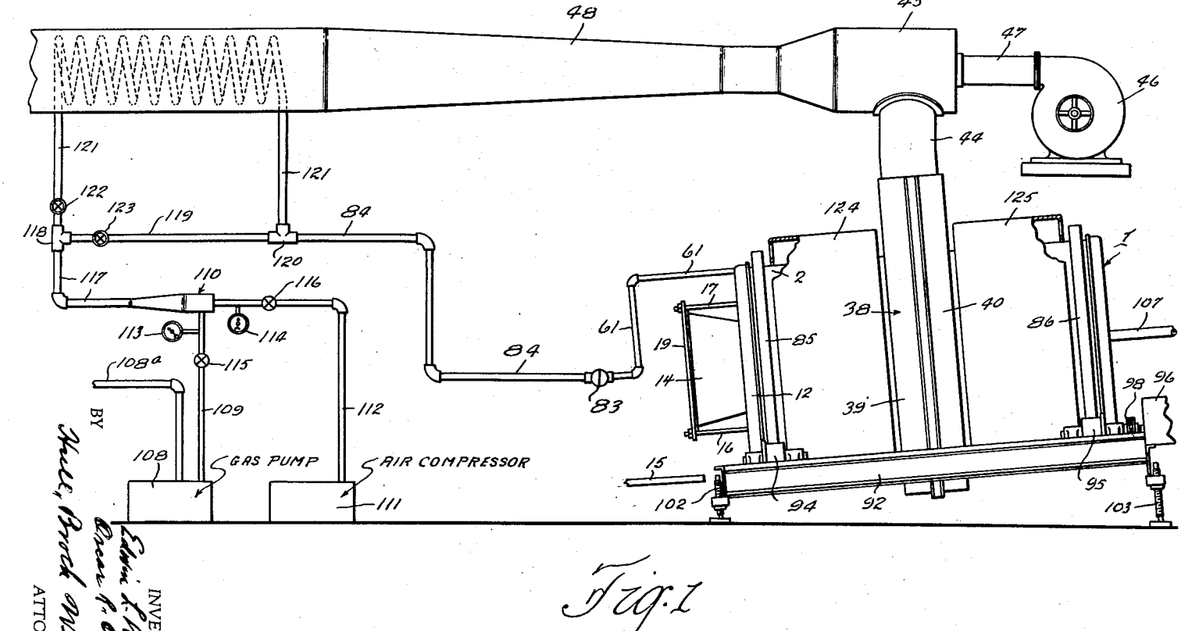
Fig. 1 is a view in side elevation of the furnace and heating system and disclosing the means for pre-mixing the fuel and for exhausting the burned gases from the furnace.
Figure 2:
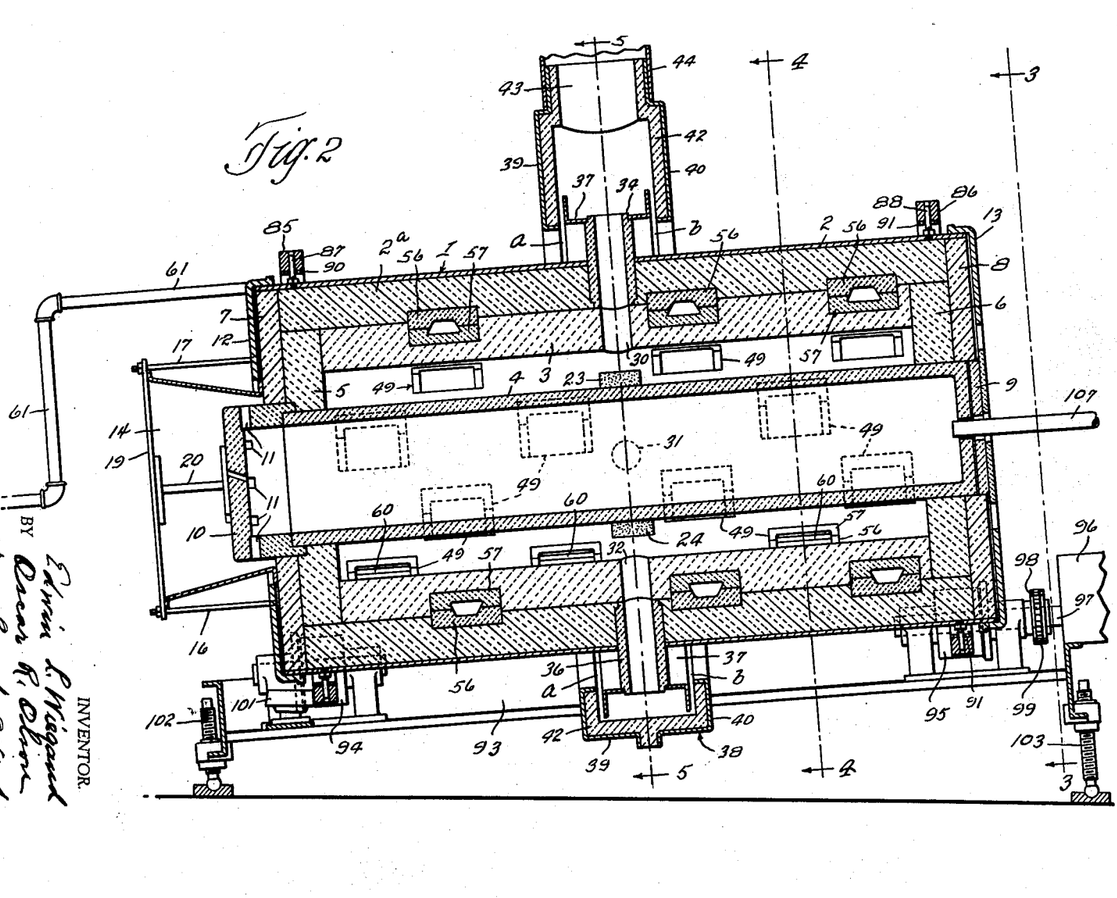
Fig. 2 is a vertical sectional view through the furnace.
Figure 5:
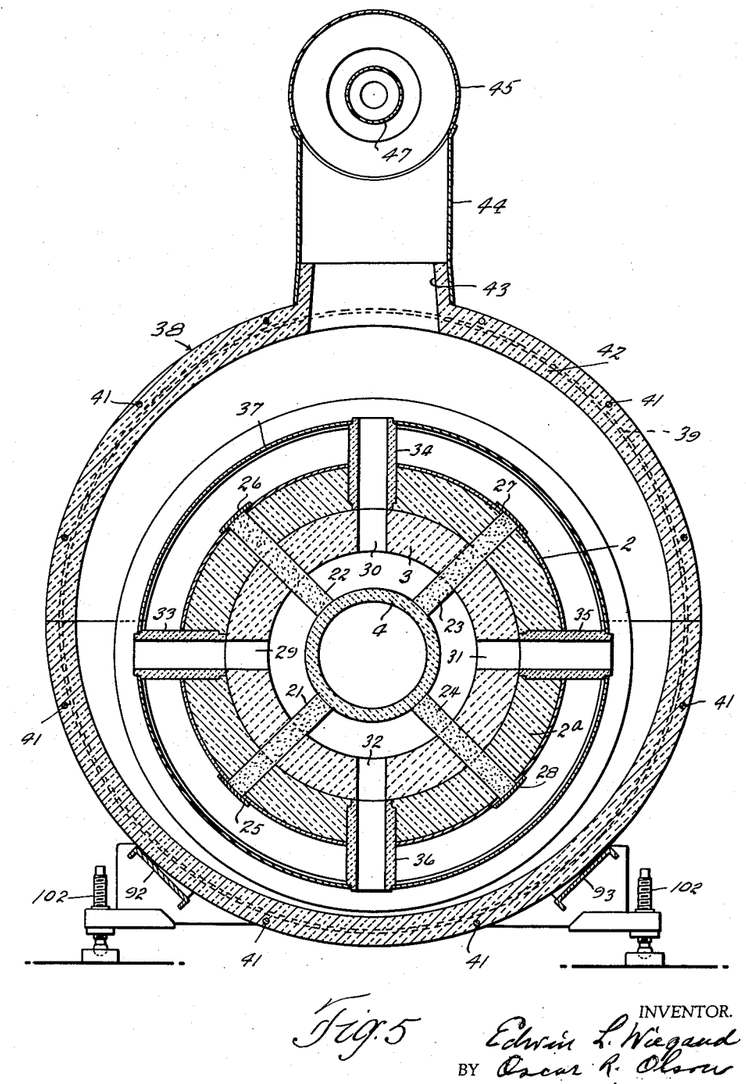
Fig. 5 is a vertical sectional view on the line 5—5 of Fig. 2.
Figure 6:
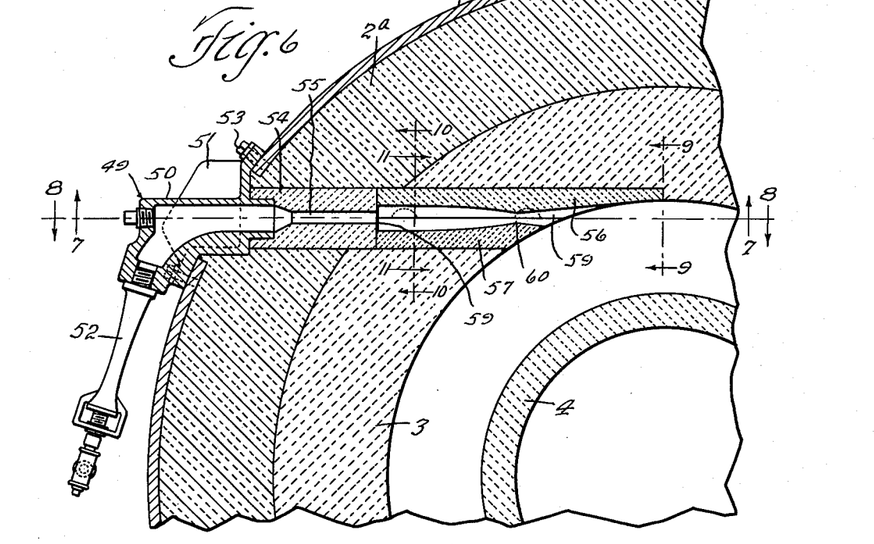
Fig. 6 is an enlarged fragmentary vertical sectional view disclosing the burner and the burner tunnels mounted in the wall of the furnace.

In order to withdraw the burned gases and products of combustion from the furnace, there is provided an exhaust manifold 38 which is made up of a pair of plates 39 and 40 which are shaped in section, as shown most clearly in Fig. 2, and secured together by means of bolts 41. The exhaust manifold is lined with heat insulating material 42. The exhaust manifold is somewhat oval in cross section, as shown in Fig. 5, and has an opening 43 at the upper end thereof from which leads a conduit 44 which connects with an expirator 45. From an inspection of Fig. 2, it will be seen that the exhaust manifold is slightly larger than the annular member 37 and surrounds the same leaving a slight space at each side thereof indicated by the reference characters a and b through which air is drawn to cool the exhaust manifold. The entire exhaust manifold is lined with heat insulated material so as to prevent it from reaching too high a temperature.

Disposed adjacent the expirator 45 is a variable speed motor operated air fan 46 which delivers air into the inspirator through a conduit 47 and which serves to provide an injector action which withdraws the burned gases and products of combustion from the furnace. These gases are delivered through a conduit 48 to the outside air through a flue or the like.

In order to heat the combustion chamber there are provided twenty-four gaseous fuel burners of the Bunsen type which are indicated by the reference character 49. Each of these burners consists of a burner head 50 which is formed of metal and which is rectangular in shape and provided with a plurality of cooling fins or ribs 51. Each of the burners also has connected therewith an air mixer 52 through which the fuel is delivered. Each burner is secured to the outer shell or casing by means of bolts 53. Adjustable means are provided for regulating the supply of air to the air mixer. Bores or passageways are provided in the wall of the combustion chamber which lead into the combustion chamber and arranged in each of these bores is a rectangular member 54 which has a bore 55 therein. As the fuel is supplied to the burner under a manifold pressure of 90 to 95 pounds, it is necessary to provide burner tunnels which are of such size, capacity and design as to cause the flame to be maintained within a well defined area. These burner tunnels are illustrated in Figs. 6–10 inclusive. Each burner tunnel consists of upper and lower blocks of suitable refractory material which are indicated by the reference characters 56 and 57. These blocks are secured in interlocking relation and are disposed within the passageway leading from each burner. Each burner tunnel has formed therein a combustion chamber of such size, shape and capacity as to create a zone in which the velocity of the fuel mixture is equal to or greater than the rate of flame propagation of the fuel delivered thereto. These burner tunnels each has an elongated delivery opening disposed so as to discharge tangentially with respect to the inner wall of the combustion chamber.

As the fuel is delivered through the air mixer for each burner it entrains therewith an approximately equal volume of air and due to the size of the bore 55, the fuel is delivered to the combustion zone at high velocity. Due to the shape and size of the burner tunnel, the flame is maintained within a definite area within the burner tunnel. It will be seen that the burner tunnel flares outwardly from the receiving end thereof and that immediately in advance of the delivery end there is provided a throat portion from which leads a somewhat flaring outlet.

Figure 7:
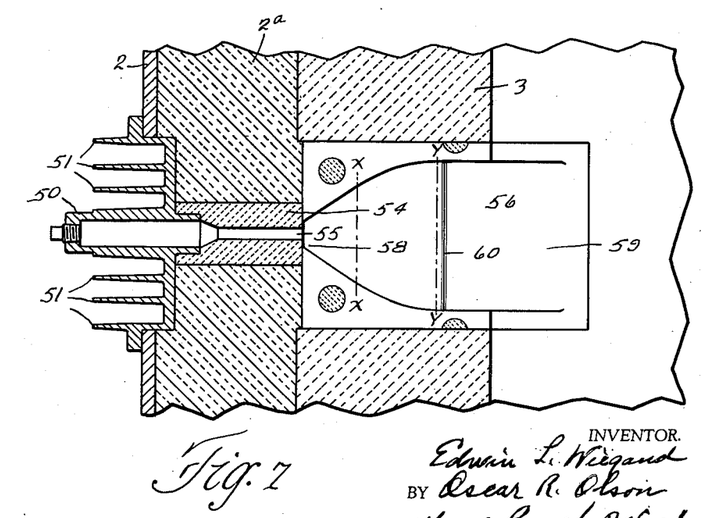
Fig. 7 is a horizontal sectional view on the line 7—7 of Fig. 6.
Figure 8:
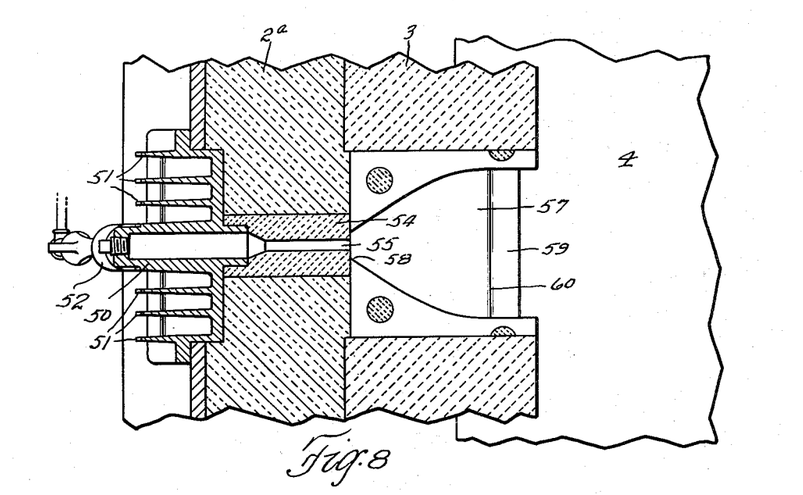
Fig. 8 is a horizontal sectional view on the line 8—8 of Fig. 6.
Figure 9:
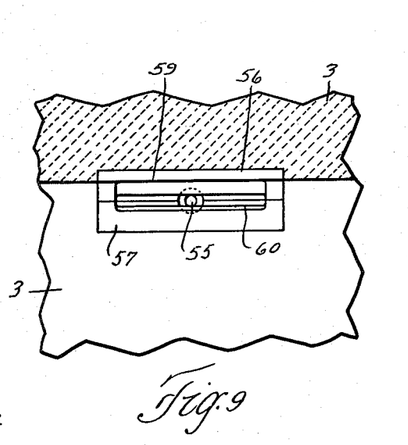
Fig. 9 is a vertical sectional view on the line 9—9 of Fig. 6.
Figure 10:
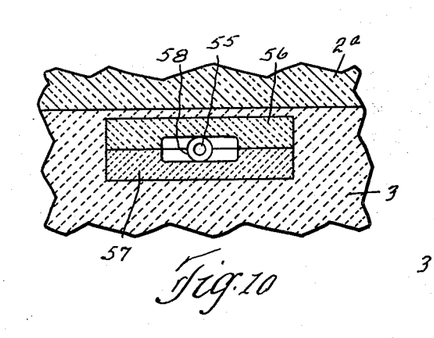
Fig. 10 is a vertical sectional view on the line 10—10 of Fig. 6.

The lines X—X and Y—Y in Fig. 7 indicate the combustion zone of the burner tunnel in which substantially all of the combustion takes place. Due to the fact that the fuel mixture is delivered to the burners at considerable pressure and velocity, the flame will flare outwardly through the burner delivery openings and tends to wrap around the retort as it is being rotated.

Figure 11:
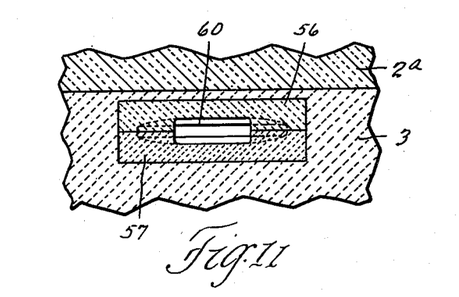
Fig. 11 is a vertical sectional view on the line 11—11 of Fig. 6.
Figure 12:
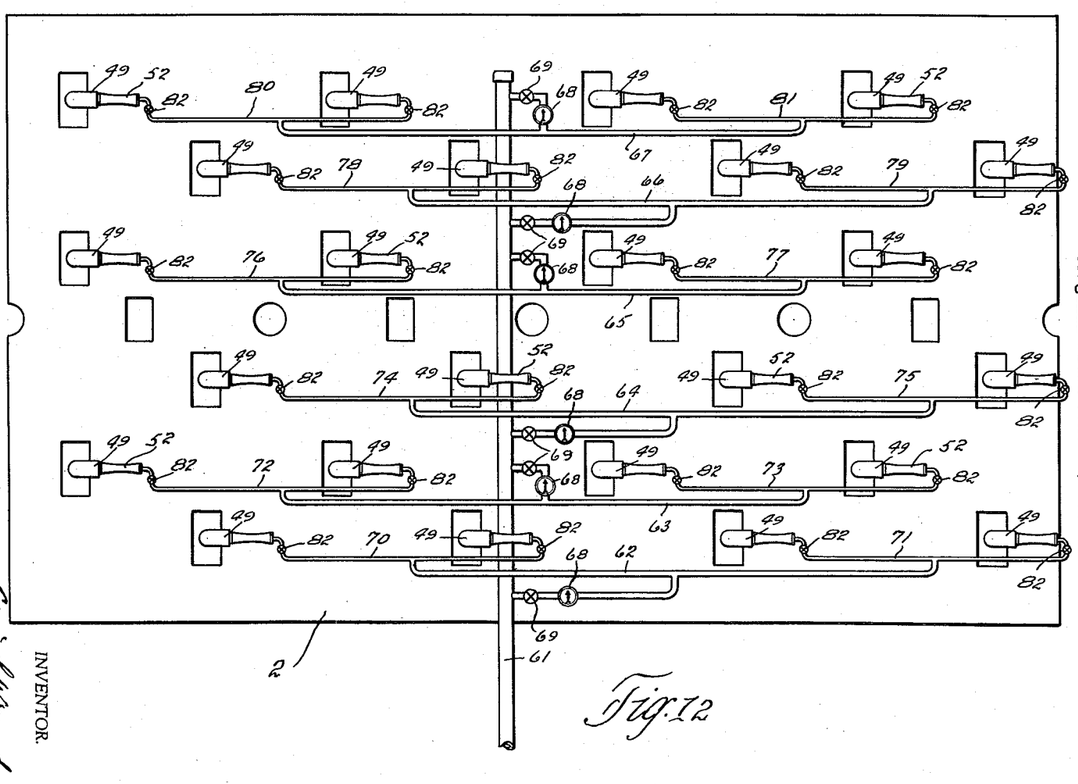
Fig. 12 is a developed view of the burner shell or casing showing the arrangement of the burners and manifolds therefor.
Figures 13, 13A:
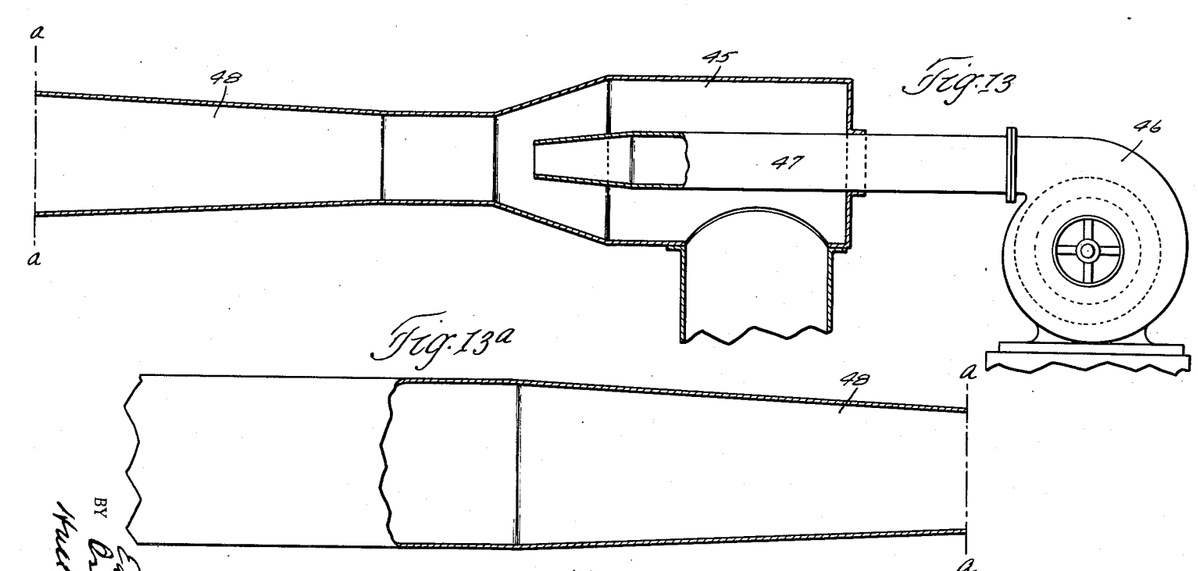
Fig. 13 is a view partly in section and partly in elevation disclosing the part of the exhaust manifold for exhausting the burned gases from the furnace and Fig. 13ª is a similar view disclosing the discharge end of the exhaust manifold.
Figure 14:
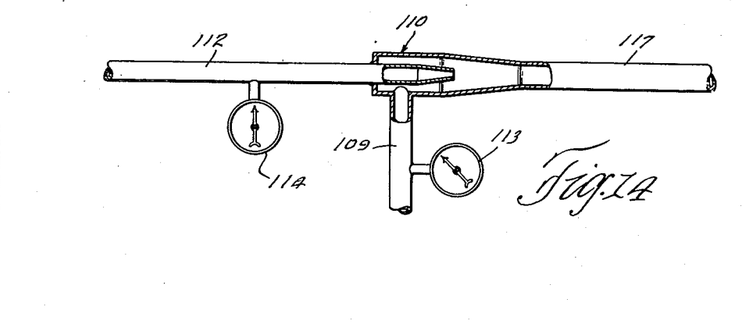
Fig. 14 is a fragmentary view partly in section and partly in elevation disclosing the inspirator for pre-mixing the fuel before delivery to the burners.

The reference character 58 designates the opening in the inlet or receiving end of the burner tunnel and the reference character 59 designates the delivery opening from the burner tunnel. The reference character 60 designates the throat portion of the burner tunnel and the relative sizes of these openings can be compared by reference to Figs. 9, 10 and 11.

Extending along the wall of the furnace and axially thereof is the main fuel manifold which is indicated by the reference character 61 and from which lead auxiliary manifolds 62, 63, 64, 65, 66, and 67. Each manifold contains a pressure meter valve 68 and a control valve 69. Leading from the auxiliary manifolds 62, 63, 64, 65, 66 and 67 are sub-manifolds 70, 71, 72, 73, 74, 75, 76, 77, 78, 79, 80 and 81. There is also provided a separate control valve 82 for each individual burner so that any group of burners or any individual burner may be separately controlled and regulated. The manifolds are so disposed and arranged that each burner is the same distance from the main manifold 61. The manifold 61 extends downwardly and communicates with a universal connection 83 through which fuel is supplied to the burners. Leading from the universal connection 83 is a fuel pipe 84 which connects with a suitable source of fuel supply. The universal connection 83 is disposed substantially coincident with the axis of rotation of the furnace.

Figure 3:
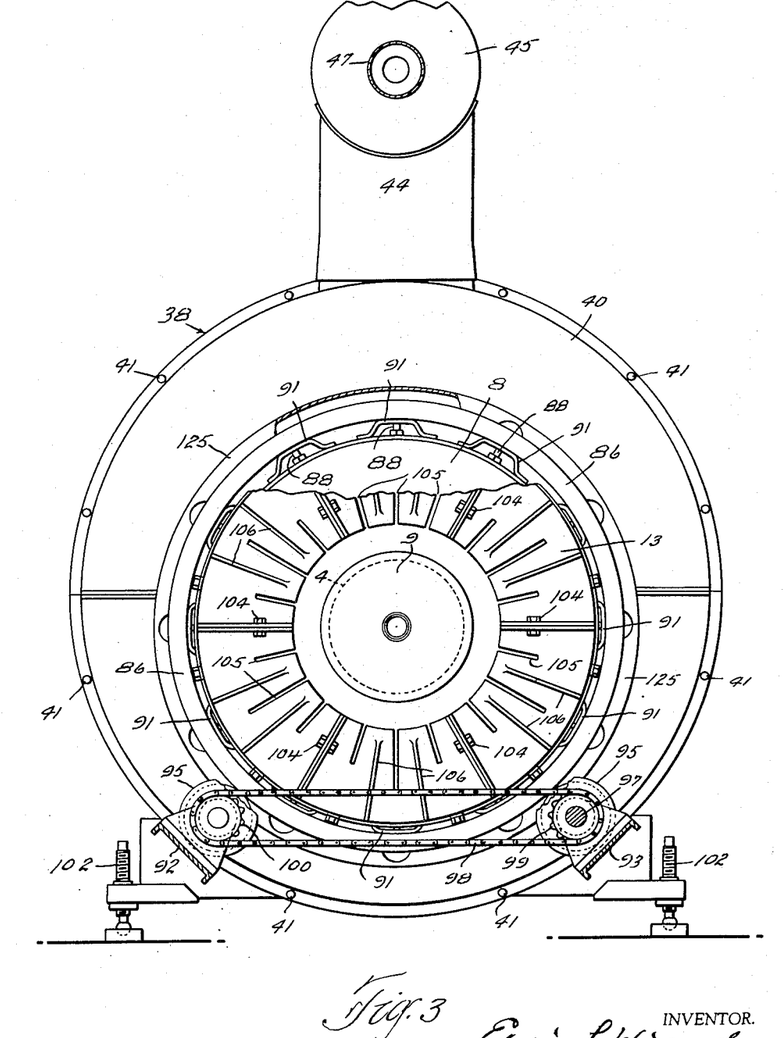
Fig. 3 is a vertical sectional view on the line 3—3 of Fig. 2.
Figure 4:
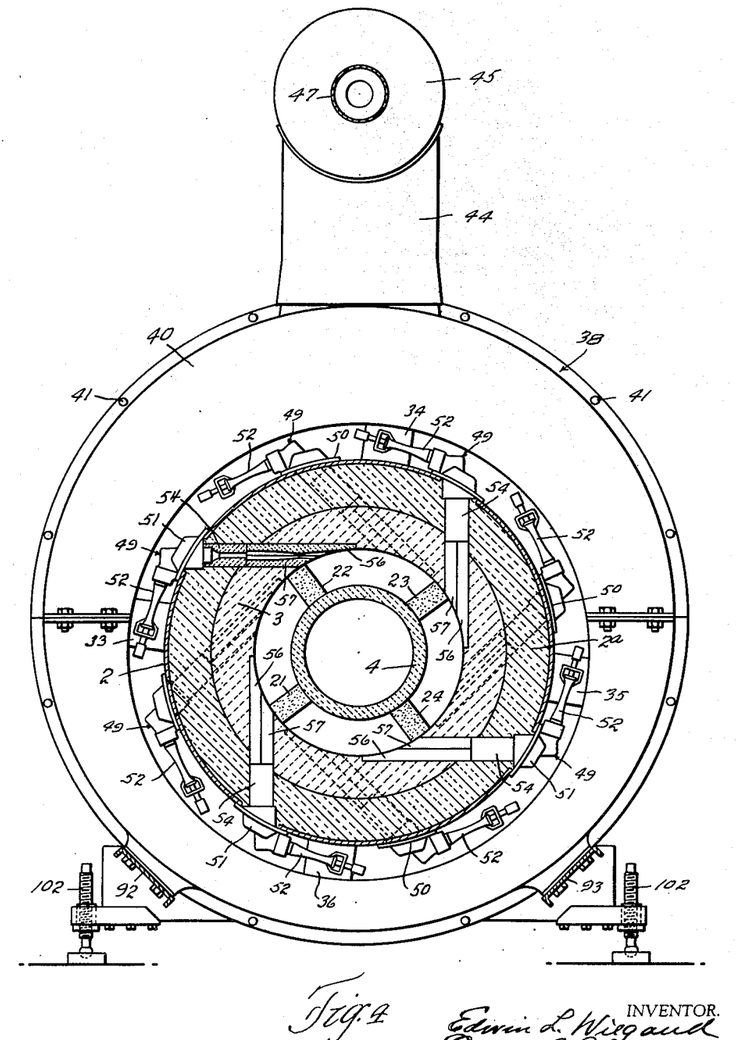
Fig. 4 is a vertical sectional view on the line 4—4 of Fig. 2.

Surrounding the furnace and disposed adjacent the opposite ends thereof are a pair of annular members called tires which are indicated by the reference characters 85 and 86. Each of the tires is somewhat larger than the furnace so as to leave a small space between the tires and the furnace wall or casing. Secured in the furnace wall and extending into openings provided in the tires are a plurality of studs 87 and 88. Disposed over the studs respectively are a plurality of spring clips 90 and 91 which are shown most clearly in Fig. 3 and serve to permit expansion of the furnace with respect to the tires.

The furnace is supported upon a base member which consists of a rectangular frame which includes longitudinally extending members 92 and 93. Carried by the longitudinally extending frame members 92 and 93 and disposed at opposite ends of the furnace are oppositely disposed pairs of rollers 94 and 95 which receive thereon the tires 85 and 86. One rear roller 95 is power operated through a suitable reduction gearing 96 and a shaft 97. The opposite roller 95 is driven through the medium of a chain 98 which engages sprockets 99 and 100. Disposed at the delivery end of the furnace and carried by the base thereof are a pair of thrust rollers one of which is shown at 101 on Fig. 2. These rollers bear against the tire 85 and serve to hold the furnace against movement toward the delivery end thereof. The frame or base is supported upon adjustable legs 102 and 103 which may be adjusted to vary the angle of inclination of the furnace which serves to vary the rate of delivery through the retort of the material being treated. The end plates for the furnace which are indicated by the reference characters 12 and 13 are made up of a plurality of sections and are bolted together by bolts 104. Each of these plates is provided with slots 105 and has ribs 106 thereon to allow for contraction and expansion of the plates. The material to be treated is delivered to the furnace through a spout 107.

In order to concentrate a great amount of energy and create a high temperature within the combustion chamber, it is necessary that the fuel be fed to the furnace at considerable pressure as the twenty-four burners are designed to burn about 1200 cubic feet of natural gas per hour, the gas containing 1000 B. t. u.'s per cubic foot. In order to obtain this result, it is necessary to pre-mix the fuel so as to obtain a fuel mixture containing one part gas to about five parts air and to admix with each volume of the mixture at the burner air mixer an equal volume of air which will give a fuel mixture at each burner containing one part gas and about eleven parts air.

The appartus for pre-mixing the fuel consists of a gas pump 108 from which leads a pipe 109 which delivers gas into an inspirator 110 at a pressure of about 75 to 80 pounds per square inch. Natural gas is delivered to the gas pump through a fuel pipe 108ª. By means of an air compressor 111 air is pumped through a pipe 112 into the inspirator 110 at a pressure of about 100 pounds per square inch. The reference characters 113, 114 indicate gauges for determining the pressure of gas an dair. Suitable control valves 115 and 116 are provided for regulating the delivery of gas and air. Leading from the inspirator 110 is a pipe 117 which connects with a T 118 from which leads a pipe 119 which connects with a T 120 to which is connected the fuel supply pipe 84. The fuel mixture delivered to the pipe 84 contains about one part gas to five parts air which is delivered to the burners at a pressure between 90 and 95 pounds per square inch where an equal volume of air is admixed therewith.

In order to provide means for preheating the fuel mixture when desired there is provided a pipe 121 which leads through the outlet from the exhausting mechanism and thence into the T 120. Disposed in the pipe 121 is a hand operated valve 122 and disposed in the pipe 119 is a hand operated valve 123 which may be operated to deliver the fuel through the outlet from the exhaust manifold when and if desired. Should it be desired to preheat the air which is delivered into the burner air mixers, the furnace is provided with a pair of shells 124 and 125 which are detachably secured over the furnace and over the burners therefor so that the air which is inspirated into the burner air mixers may be heated, if desired.

*Operation*

In the operation of the furnace, power is supplied to the shaft 97 to rotate the combustion chamber and with it the retort which is supported therein. Fuel of the proper mixture is delivered to the main manifold 61 through the fuel supply pipe 84. An approximately equal volume of air is admixed with the fuel at the air mixer for each burner. The fuel is delivered to each burner at a pressure of 80 to 100 pounds per square inch. The fuel mixture is ignited at the burners in any suitable manner. Due to the design, shape and surface area of the burner tunnels, combustion normally takes place in the combustion zone of the burner tunnels and in designing the burner tunnels it is necessary to take into consideration the rate of flame propagation of the particular mixture of fuel, premature kindling, the type of refractory used in the construction of the combustion chamber, and the velocity and pressure at which the gas is delivered to the burner tunnels in order to keep the flame from flashing or burning back too close to the burner and in order to maintain the flame and combustion within a well defined area in the burner tunnels. The adjustable legs on the furnace are adjusted so that the retort has the proper angle of inclination to maintain the proper charge of material in the retort at all times so that the material being treated will be delivered from the furnace at the desired temperature. However, this angle may be varied depending upon the nature and character of the material being treated. By varying the angle of inclination of the furnace or by varying the speed of rotation of the furnace or by varying both, the time of the heating cycle and the temperature of the material delivered from the furnace may be regulated and controlled. The material to be treated is fed to the furnace by any suitable feeding mechanism which should be adjustable to vary the rate at which the material is fed into the furnace. With all of the burners in operation, it is possible to obtain a temperature in the combustion chamber of approximately 3000° F. without preheating the fuel. Under such conditions, the temperature within the retort will be between 2100° F. and 2500° F., depending upon the rate of delivery of the material through the retort.

With a furnace constructed and operated as herein described, it is possible to concentrate a very great amount of energy within a small combustion space and at the same time treat a very large amount of material per hour and maintain the maximum temperature desired. If the fuel is preheated, higher temperatures and efficiency can be attained with the same fuel pressure and velocity. The speed of the blower which exhausts the products of combustion from the furnace may be varied so as to maintain the desired pressure condition in the combustion chamber.

It will now be clear that the heating system and apparatus herein disclosed will accomplish the objects of the invention as hereinbefore stated. It is, of course, to be understood that the embodiment of the invention herein disclosed is to be considered merely as illustrative and not in a limiting sense as various changes and modifications may be made in the details of construction, arrangement and design of parts, without departing from the spirit of the invention. For example, in some cases, it may be necessary to provide a plurality of exhaust manifolds disposed intermediate the ends of the furnace which would draw equally from both sides so as to maintain substantially uniform conditions throughout the combustion chamber. In some cases it may also be desirable to provide automatic temperature control for the furnace in addition to the control of the rate of the work being done and this control may be arranged to respond to conditions within the retort or within the combustion chamber or within both. The furnace is suitable for heat treating uniform or non-uniform material of various qualities and kinds. The plug which closes one end of the retort may be removable to permit the mechanical removal of fritted material in case the material being treated is subject to fritting.

The invention is therefore limited only in accordance with the scope of the appended claims.

Having thus described our invention, what we claim is:

1. A muffle type calcining furnace comprising a combustion chamber, a refractory retort disposed within said combustion chamber, means for rotating said combustion chamber and retort, and means for regulating the pressure conditions within said combustion chamber including an exhaust manifold and means for cooling the same.

2. A muffle type calcining furnace comprising a combustion chamber, a retort disposed within said combustion chamber, means for rotating said combustion chamber and retort, a plurality of gas burners distributed about and along the circumferential wall of said combustion chamber and so arranged as to discharge tangentially with respect thereto and means for regulating the pressure condition within the combustion chamber.

3. A muffle type calcining furnace comprising a combustion chamber having burner tunnels therein, a retort disposed within said combustion chamber, means for rotating said retort and combustion chamber, a plurality of gaseous fuel burners disposed about the circumferential wall of said combustion chamber and arranged so as to discharge into said burner tunnels, said burner tunnels being arranged tangentially with respect to said combustion chamber.

4. A muffle type calcining furnace comprising a combustion chamber, a rotary retort disposed within said combustion chamber, a plurality of burners for heating said combustion chamber distributed about and along the circumferential wall thereof and arranged in staggered relation, means for rotating said retort, combustion chamber and burners and a fuel supply line for said burners.

5. A muffle type calcining furnace comprising a combustion chamber, a rotatable retort disposed within said combustion chamber, means for rotating said retort and means for adjusting the angular position of said retort and the speed of rotation thereof to regulate the rate of delivery of material therethrough, and means for withdrawing products of combustion from said combustion chamber including an exhaust manifold and an expirator.

6. A calcining furnace comprising a combustion chamber, a refractory retort disposed within said combustion chamber and heated therefrom but being out of communication therewith, means for maintaining the temperature within said retort in excess of 2000° F., means for rotating said retort, and means for delivering material through said retort at a predetermined rate to regulate the temperature of the material being discharged from the retort and means for withdrawing products of combustion from said combustion chamber to regulate pressure conditions therewithin.

7. A furnace of the muffle type including a combustion chamber, a refractory retort disposed within said combustion chamber, a plurality of Bunsen type burners disposed about the wall of said combustion chamber, means for delivering a mixture of air and gas to said burners at a manifold pressure in excess of thirty pounds per square inch, means for entraining within said mixture at the burners an approximately equal volume of air, means for rotating said retort and means for regulating pressure conditions in said combustion chamber.

8. A muffle type furnace comprising a combustion chamber, a refractory retort disposed within said combustion chamber, means for rotating said retort, a plurality of gaseous fuel burners for heating said combustion chamber, means for withdrawing the burned gases from said combustion chamber at a predetermined rate comprising an exhaust manifold surrounding said combustion chamber, an expirator connected with said manifold and means for delivering air through said expirator.

9. A muffle type furnace comprising a combustion chamber, a refractory retort disposed within said combustion chamber, means for rotating said retort, a plurality of gaseous fuel burners for heating said combustion chamber, means for withdrawing the burned gases from said combustion chamber at a predetermined rate comprising an exhaust manifold surrounding said combustion chamber, an expirator connected with said manifold and means for delivering air through said expirator, and means admitting air into said manifold for cooling the same.

10. A heat treating furnace comprising an elongated retort through which material to be treated is fed, a combustion chamber of relatively small volume surrounding the retort substantially throughout the length thereof, a plurality of burners of the Bunsen type arranged to discharge their products into the chamber in such diffused manner as to practically completely envelop the retort, means for mixing air and gaseous fuel in given proportions and delivering the mixture to the gas inlets of the burners under relatively high pressure, means for causing the material to be treated to pass through said retort at a predetermined rate including means for rotating said retort, and an exhaust manifold and expirator for regulating pressure conditions in said combustion chamber.

11. A heat treating furnace comprising an elongated cylindrical retort, a combustion chamber surrounding the retort substantially from end to end thereof, the inner surface of the peripheral wall of said chamber being cylindrical and in relatively close substantially concentric relation to the retort, means for causing material to be treated to pass through said retort in a continuous stream including means for rotating said retort, gaseous fuel burners distributed about and along the peripheral wall of the combustion chamber in such relation to one another as to practically completely envelop the retort in the products of combustion, the burners being arranged to discharge their products about the retort in the same general direction in concentric relation thereto, the combustion chamber being provided with a plurality of separated outlet ports, and suction means communicatively connected to said ports.

12. A heat treating furnace comprising an elongated cylindrical retort through which material to be treated is adapted to be fed, a cylindrical combustion chamber surrounding the retort substantially from end to end thereof and whose inner surface is in relatively close substantially concentric relation to the retort, burner tunnels opening through the peripheral wall in tangential relation to the inner surface thereof, the tunnels being arranged in circumferential series in which the tunnels are spaced substantially equal distances apart, and the series being spaced apart longitudinally of the combustion chamber throughout the length thereof, the tunnels of one series being staggered with respect to those of an adjacent series, Bunsen burners arranged to discharge their products into the tunnels, means for mixing air and gaseous fuel in given proportions and delivering the mixture to the gas inlets of the burners under pressure, the combustion chamber being provided with a plurality of separated outlet ports, and suction means communicating with said ports.

13. A heat treating furnace comprising a cylindrical combustion chamber, a cylindrical retort disposed axially thereof, the annular space between the retort and peripheral wall of the combustion chamber being of relatively small volume, means rotatably supporting the combustion chamber, burner tunnels opening through the peripheral wall of the combustion chamber in substantially tangential relation to the inner surface thereof, said tunnels being distributed about and along the peripheral wall of the combustion chamber in such manner that products of combustion projected therethrough will practically completely envelop the retort, Bunsen burners associated with the tunnels, a supply manifold communicating with the gas inlets of all burners, means for mixing air and gaseous fuel in given proportions and delivering the mixture to said manifold under pressure, the peripheral wall of the combustion chamber being provided with circumferentially spaced radial outlet ports at about its longitudinal center, a stationary manifold wherewith said outlet ports communicate, and suction means communicatively connected with said outlet manifold.

14. A furnace of the character described comprising an elongated rotatable combustion chamber, a rotatable retort disposed within said combustion chamber and through which material to be treated is adapted to be fed in a continuous stream, said combustion chamber being generally cylindrical and surrounding said retort substantially from end to end thereof and having its inner peripheral wall disposed relatively close to said retort, refractory burner tunnels opening through the peripheral wall of said combustion chamber, means for rotating said combustion chamber and retort, Bunsen burners carried by the outer wall of said combustion chamber and arranged to discharge their products into said tunnels, means for mixing air and gaseous fuel under pressure in predetermined proportions and delivering such mixture to said burners under relatively high pressure, each of said burners including means for admixing with said mixture an approximately equal volume of air, the pressure at which the fuel mixture is delivered to said burners being such that the flame will be maintained within a definite area in the burner tunnels, and means for withdrawing the products of combustion from said combustion chamber at a predetermined rate to maintain predetermined pressure conditions within said combustion chamber.

15. A furnace of the character described comprising a combustion chamber, a retort disposed in said combustion chamber and heated therefrom, a plurality of gas burners disposed about the circumferential wall thereof, means for withdrawing burned gases from said combustion chamber at a predetermined rate including an exhaust manifold and an expirator connected with said manifold, each of said burners including an air mixer, means for admixing a predetermined mixture of gaseous fuel and air both under pressure and delivering said mixture to said air mixers, there being such relationship between said air mixers and the pressure at which the fuel mixture is delivered thereto as to cause an approximately equal volume of air to be entrained in the mixture at the burners.

16. In a furnace of the character described comprising a combustion chamber, a retort disposed within said combustion chamber and heated therefrom, a plurality of Bunsen burners disposed about the circumferential wall of said combustion chamber and discharging about said retort in concentric relation thereto, means for rotating said combustion chamber, retort and burners, means for admixing a predetermined mixture of gaseous fuel and air both under pressure and subsequently delivering such mixture to said burners at a high pressure, each of said burners including means for entraining in said mixture an approximately equal volume of air.

17. A furnace of the character described comprising a combustion chamber, a retort disposed within said combustion chamber, said combustion chamber having disposed about the peripheral wall thereof a plurality of refractory burner tunnels, a plurality of gaseous fuel burners disposed so as to discharge into said tunnels and to maintain combustion therein, means for delivering a predetermined mixture of gas and air to said burners, such mixture being under such pressure and at such velocity that the flame will be maintained within a definite area in the burner tunnels, means for admixing an equal volume of secondary air with such mixture at the burners, and means for withdrawing burned gases from said combustion chamber at a predetermined rate.

18. A furnace of the character described comprising a combustion chamber, an elongated rotatable retort disposed within said combustion chamber, the inner peripheral wall of said combustion chamber being disposed in relatively close substantially concentric relation to said retort, a plurality of gaseous fuel burners disposed about and along the peripheral wall of said combustion chamber in such position as to substantially envelop the retort in the products of combustion, each of said burners being arranged so as to discharge in the same direction relative to the direction of rotation of said retort, said combustion chamber having a plurality of separated outlet ports and suction means for exhausting the products of combustion from said combustion chamber at a predetermined rate so as to maintain a predetermined pressure condition within the combustion chamber, and means for rotating said retort and combustion chamber.

19. A furnace of the character described comprising a rotatable refractory combustion chamber, a rotatable refractory retort disposed within said combustion chamber and out of communication therewith and through which material to be treated is adapted to be fed in a continuous stream, said combustion chamber surrounding said retort substantially from end to end thereof and having its inner circumferential wall disposed relatively close to said retort, refractory burner tunnels opening through the peripheral wall of said combustion chamber and discharging in the direction of rotation of said combustion chamber, gaseous fuel burners carried by said combustion chamber and discharging into said tunnels, and means for rotating said combustion chamber, burners and retort.

20. The combination with a furnace having an inner wall and an outer wall, of a gaseous fuel burner head secured to the outer wall of said furnace and having a passageway therein through which a fuel mixture is discharged, a burner tunnel disposed between the inner and outer walls of said furnace and comprising a section having a restricted bore therein through which a fuel mixture is discharged and an adjacent section having an elongated chamber formed therein the walls of which are shaped to define a zone in which the velocity of the fuel mixture is at least equal to the rate of flame propagation of the fuel mixture, said burner tunnel having a delivery outlet disposed tangentially to the inner wall of said furnace.

21. The combination, with a furnace having inner and outer walls shaped to provide a combustion chamber, of a gaseous fuel burner head secured to the outer wall of said furnace and having a passageway therein through which a fuel mixture is discharged, a burner tunnel arranged within the walls of said furnace and comprising a section having a restricted bore therein through which a fuel mixture is delivered and an adjacent section having an elongated combustion chamber formed therein which changes in shape toward the delivery end thereof without materially affecting the cross sectional area thereof and defining a zone in which the velocity of the fuel mixture is at least equal to the rate of flame propagation of the fuel mixture, said burner tunnel having a flattened elongated delivery outlet disposed tangentially to the inner wall of said furnace.

22. The combination, with a furnace having inner and outer walls, of a gaseous fuel burner head secured to the outer wall of said furnace and having a passageway therein through which a fuel mixture is discharged, a burner tunnel arranged within the walls of said furnace and comprising a section having a restricted bore therein through which the fuel mixture is discharged and an adjacent section having an elongated chamber formed therein the walls of which are shaped to define a zone in which the velocity of the fuel mixture is equal to or greater than the rate of flame propagation of the fuel mixture, said burner tunnel having a delivery outlet disposed tangentially to the inner wall of said furnace, said chamber having a restricted throat portion disposed inwardly of said delivery outlet.

23. The combination, with a furnace having inner and outer walls, of a gaseous fuel burner head secured to the outer wall of said furnace and having a passageway therein through which a fuel mixture is discharged, a burner tunnel disposed between the inner and outer walls of said furnace and comprising a section having a restricted bore therein through which the fuel mixture is discharged and an adjacent section having an elongated chamber formed therein the walls of which are shaped to define a zone in which the velocity of the fuel mixture is equal to or greater than the rate of flame propagation of the fuel mixture, said burner tunnel having a delivery outlet disposed tangentially to the inner wall of said furnace.

24. A furnace of the character described comprising a rotatable combustion chamber, a plurality of tires surrounding said combustion chamber for rotatably supporting the same, means for rotating said tires and combustion chamber and means interposed between said tires and the wall of said combustion chamber for permitting radial expansion thereof with respect to said tires.

25. A furnace of the character described comprising a combustion chamber, a plurality of tires surrounding said combustion chamber and spaced therefrom, resilient means disposed between each of said tires and the wall of said combustion chamber for permitting radial expansion of said combustion chamber with respect to said tires, and means for rotating said tires and combustion chamber.

26. A muffle type calcining furnace comprising a combustion chamber formed principally of refractory material and adapted to be heated to a very high temperature, a refractory retort disposed within said combustion chamber, tires surrounding said combustion chamber and slightly spaced therefrom, a plurality of resilient members disposed between each of said tires and the wall of said combustion chamber permitting radial expansion of said combustion chamber with respect to said tires, means for heating said combustion chamber and retort to a high temperature, and means for rotating said tires, combustion chamber and retort.

27. A furnace comprising a combustion chamber, a refractory retort disposed within said combustion chamber and heated therefrom but out of communication therewith and through which material may be delivered in a continuous stream, means for introducing combustion gases at a high velocity into said combustion chamber and about said retort, means for rotating said retort, means for delivering material through said retort in a continuous stream at a predetermined rate and aspirating means for withdrawing the products of combustion from said combustion chamber at a rate to regulate pressure conditions therewithin and to prevent excess back pressure in the high velocity gases.

EDWIN L. WIEGAND.
OSCAR R. OLSON.